US006608138B2

(12) United States Patent
Carignano et al.

(10) Patent No.: US 6,608,138 B2
(45) Date of Patent: Aug. 19, 2003

(54) PERFLUOROPOLYETHER COMPOUNDS AS ADDITIVES IN FORMULATIONS

(75) Inventors: Gabriella Carignano, Milan (IT); Mattia De Dominicis, Padova (IT)

(73) Assignee: Ausimont S.p.A., Milan (IT)

( * ) Notice: Subject to any disclaimer, the term of this patent is extended or adjusted under 35 U.S.C. 154(b) by 71 days.

(21) Appl. No.: 09/794,086

(22) Filed: Feb. 28, 2001

(65) Prior Publication Data

US 2001/0024695 A1 Sep. 27, 2001

(30) Foreign Application Priority Data

Feb. 29, 2000 (IT) ........................................ MI00A0378

(51) Int. Cl.[7] ................................................ C08G 77/06

(52) U.S. Cl. ...................... 524/755; 524/13; 427/385.5; 427/393.5; 117/138.5; 424/306

(58) Field of Search ................ 524/13, 755; 427/383.5, 427/385.5; 117/138.5; 424/306

(56) References Cited

U.S. PATENT DOCUMENTS

| | | | | | |
|---|---|---|---|---|---|
| 2,242,218 | A | * | 5/1941 | Auer | |
| 3,665,041 | A | * | 5/1972 | Sianesi et al. | |
| 3,715,378 | A | * | 2/1973 | Sianesi et al. | |
| 3,810,874 | A | * | 5/1974 | Mitsch et al. | |
| 3,859,121 | A | * | 1/1975 | Yeadon et al. | 424/DIG. 10 |
| 4,414,128 | A | * | 11/1983 | Goffinet | 134/40 |
| 4,745,009 | A | * | 5/1988 | Piacenti et al. | 427/385.5 |
| 4,746,550 | A | * | 5/1988 | Strepparola et al. | 427/385.5 |
| 4,950,329 | A | * | 8/1990 | McIntyre et al. | 106/15.05 |
| 5,141,983 | A | * | 8/1992 | Hasegawa et al. | |
| 5,178,668 | A | * | 1/1993 | Traver et al. | |
| 5,356,716 | A | * | 10/1994 | Patel | |
| 5,591,551 | A | * | 1/1997 | Audett et al. | 430/18 |
| 5,593,483 | A | * | 1/1997 | Brunken | |
| 5,631,047 | A | | 5/1997 | Friloux | |
| 5,691,000 | A | * | 11/1997 | Montagna et al. | 427/388.4 |
| 5,855,817 | A | * | 1/1999 | Walker | |
| 6,071,564 | A | * | 6/2000 | Marchetti et al. | 427/385.5 |

FOREIGN PATENT DOCUMENTS

| | | | | |
|---|---|---|---|---|
| EP | 0 148 482 | A2 | * | 7/1985 |
| EP | 0 239 123 | A2 | * | 9/1987 |
| EP | 0 289 317 | A1 | | 11/1988 |
| EP | 0 337 313 | A1 | | 10/1989 |
| EP | 0 374 803 | A2 | | 6/1990 |

* cited by examiner

*Primary Examiner*—David W. Wu
*Assistant Examiner*—Henry S. Hu
(74) *Attorney, Agent, or Firm*—Arent Fox Kintner Plotkin & Kahn PLLC

(57) ABSTRACT

Processes for wood treatment using mono- and bifunctional perfluoropolyether compounds as additives in formulations for the wood treatment, said perfluoropolyether compounds having the structures:

$$R_f\text{—O—CFY—L—W} \qquad (C)$$

$$\text{W—L—YFC—O—}R_f\text{O—CFY—L—W} \qquad (D)$$

wherein:

L is an organic group selected from $—CH_2—(OCH_2CH_2)_n—$, —CO—NR'—, with R'═H or $C_1$–$C_4$ alkyl group; n=0–8; Y═F, $CF_3$;

W is selected from $C_1$–$C_{50}$ alkyl groups, optionally containing one or more ether O, $C_6$–$C_{50}$ aryl groups, $C_7$–$C_{50}$ alkyl-aryl or aryl-alkyl groups;

Rf is a perfluoropolyether radical.

14 Claims, No Drawings

PERFLUOROPOLYETHER COMPOUNDS AS ADDITIVES IN FORMULATIONS

The present invention relates to the use of additives for the protective treatment of wood materials to confer improved oil- and hydro-repellence properties.

Specifically, the invention relates to the addition of additives to the formulations usually utilized for the wood treatment, such as for example impregnating, antivegetative, insecticidal formulations, etc. Said additives are effectively used at very low surface concentrations, avoiding to modify the surface aspect of the treated wood material.

Compounds able to give wood hydro-repellence properties are known in the prior art. U.S. Pat. No. 5,141,983 which describes polyurethane-acrylic copolymers dispersed in water can for example be mentioned. The drawback of these products consists in that they are not able to confer suitable oil-repellence properties.

Other compounds, for example functionalized amino-organo hydrogenated siliconates are described in U.S. Pat. No. 5,178,668. Also for these products, there is the drawback that they are unable to confer suitable oil-repellence properties.

In U.S. Pat. No. 5,855,817 compounds having more than one hydroxyl function in combination with quaternary ammonium salts to confer hydro-repellence to wood, are described. Also in this case the oil-repellence properties are not high.

There are also aqueous formulations based on siliconates, polyurethanes and silicates, described in U.S. Pat. No. 5,356,716. Also in this case no mention is made to possible conferred oil-repellence properties.

Hydrocarbon solvent-based formulations comprising mixtures of fluoropolymers, hydrogenated silanes and silicones are described in U.S. Pat. No. 5,593,483. Also in this case no mention is made to possible conferred oil-repellence properties.

In U.S. Pat. No. 5,691,000 specific perfluoropolyether phosphor monoester compounds able to give hydro- and oil-repellence to wood are described. The solvents used for the dissolution of these compounds are CFC-113 or alcohol/water mixtures. In this patent also other perfluoropolyether compounds having different functionalities are exemplified. The Examples show that these latter derivatives have lower hydro- and oil-repellence properties in comparison with the perfluoropolyether phosphor monoesters. In particular, the hydro-repellence values of phosphor monoesters when applied on wood are unsatisfactory. In fact, the Applicant has noticed that the oil- and hydro-repellence test is not sufficiently discriminating to identify the real protection degree given to wood. For this reason, these products have found a poor commercial application for the protective wood treatment. In this patent no mention is made to the use as additives of said products in the formulations used for wood.

The technical problem that the present invention intends to solve is that to find additives showing the following property combination:

- improved hydro-repellence properties;
- improved oil-repellence properties;
- absence of any change of the wood natural aspect;
- substantial maintenance of the properties conferred by impregnating, antivegetative, insecticidal, etc., formulations also after additive addition;
- good compatibility of the additive with impregnating, anti-vegetative, insecticidal, etc. formulations so as to have substantially uniform oil- and hydro-repellence properties on the surface of the treated wood;

- improvement of the wetting capacities of the above mentioned formulations for wood;
- improved friction coefficient, i.e. decrease of the friction coefficient values of the wood surface which implies a wear limitation.

The need was therefore felt to have available additives for formulations used in the wood treatment, able to give the combination of the above mentioned properties.

An object of the invention are therefore mono- and bifunctional perfluoropolyether compounds and their use as additives in formulations for the wood treatment, excluding the formulations based on paraffin waxes dissolved in hydrocarbon solvents, said perfluoropolyether compounds having the following structures:

$$R_f—CFY—L—W \quad (C)$$

$$W—L—YFC—O—R_f—CFY—L—W \quad (D)$$

wherein:

L is an organic group selected from $—CH_2—(OCH_2CH_2)_n—$, $—CO—NR'—$, with R'=H or $C_1$–$C_4$ alkyl group;

n=0–8, preferably 1–3;

Y=F, $CF_3$;

W is selected from $C_1$–$C_{50}$ alkyl groups, preferably $C_8$–$C_{25}$, optionally containing one or more ether O, $C_6$–$C_{50}$ aryl groups, $C_7$–$C_{50}$ alkyl-aryl or aryl-alkyl groups;

$R_f$ has a number average molecular weight in the range 350–8,000, preferably 500–3,000 and it comprises repeating units having at least one of the following structures, statistically placed along the chain:

$(CFXO)$, $(CF_2CF_2O)$, $(CF_2CF_2CF_2O)$, $(CF_2CF_2CF_2CF_2O)$, $(CR_4R_5CF_2CF_2O)$, $(CF(CF_3)CF_2O)$, $(CF_2CF(CF_3)O)$, wherein

X=F, $CF_3$;

$R_4$ and $R_5$, equal to or different from each other, are selected from H, Cl, or perfluoroalkyl from 1 to 4 carbon atoms.

In particular Rf can have one of the following structures:

1) $—(CF_2O)_{a'}—(CF_2CF_2O)_{b'}—$ with a'/b' in the range 0.5–2, extremes included, a' and b' being integers such as to give the above mentioned molecular weight;

2) $—(C_3F_6O)_r—(C_2F_4O)_b—(CFXO)_t—$ with r/b=0.5–2.0; (r+b)/t is in the range 10–30, b, r and t being integers such as to give the above mentioned molecular weight, X has the above mentioned meaning;

3) $—(C_3F_6O)_{r'}—(CFXO)_{t'}—$ t' can be 0;

when t' is different from 0 then r'/t'=10–30, r' and t' being integers such as to give the above mentioned molecular weight; X has the above indicated meaning;

4) $—(OCF_2CF(CF_3))_z—OCF_2(R'f)_y—CF_2O—(CF(CF_3)CF_2O)_z—$ wherein z is an integer such that the molecular weight is the above mentioned one;

y is an integer between 0 and 1 and R'f is a fluoroalkylene group having for example 1–4 carbon atoms;

5) $—(OCF_2CF_2CR_4R_5)_q—OCF_2(R'f)_y—CF_2O—(CR_4R_5CF_2O)_s—$wherein:

q and s are integers such that the molecular weight is the above mentioned one;

$R_4$, $R_5$, R'f, y have the above mentioned meaning;

6) $—(C_3F_6O)_{r'''}(CFXO)_{t'''}—OCF_2(R'f)_y—CF_2O(CF(CF_3)CF_2O)_{r'''}(CFXO)_{t'''}—$ wherein r'''/t'''=10–30, r''' and t''' being integers such as to give the above mentioned molecular weight;

R'f and y having the above mentioned meaning.

In the above indicated formulas:

$—(C_3F_6O)—$ can represent units of formula $—(CF(CF_3)CF_2O)—$ and/or $—(CF_2—CF(CF_3)O)—$ In the structure (C) wherein Rf is monofunctional, the other end group is of the T—O— type, wherein T is a (per) fluoroalkyl group selected from: $—CF_3$, $—C_2F_5$, $—C_3F_7$, $—CF_2Cl$, $—C_2F_4Cl$, $—C_3F_6Cl$; optionally one or two F atoms, preferably one, can be replaced by H.

The mentioned fluoropolyethers are obtainable by the well known processes in the prior art, see for example the following patents herein incorporated by reference: U.S. Pat. Nos. 3,665,041, 2,242,218, 3,715,378, and EP 239,123. The functionalized fluoropolyethers are for example obtained according to EP 148482, U.S. Pat. No. 3,810,874.

The compounds of structure (C) are obtained by reacting a monofunctional perfluoropolyether ester derivative with an alkylamine. The alkylamine, generally under waxy form, is melted at a temperature in the range 40°–60° C. The perfluoropolyether ester derivative is dropped in the amine in an equimolar amount under stirring and maintaining the reactor at the desired temperature. At the end of the addition the alcohol which has formed from the condensation reaction is evaporated.

The compounds of structure (D) are obtained by reacting a bifunctional perfluoropolyether ester derivative with an alkylamine. The alkylamine, generally under waxy form, is melted at a temperature in the range 40°–60° C. The bifunctional perfluoropolyether ester derivative is dropped in the amine in molar amount 0.5 with respect to the amine under stirring and maintaining the reactor at the desired temperature. At the end of the addition the alcohol which has formed from the condensation reaction is evaporated.

The preferred compounds of the invention have structure (D) wherein L is —CO—NR'—, with R'=H; W is a $C_8$–$C_{25}$ alkyl group; Rf has structure 1).

Mixtures of the above mentioned compounds (C) and (D) can also be used.

The Applicant has surprisingly found that by using the above defined perfluoropolyether derivatives as additives of formulations for the wood treatment, the combination of the above mentioned properties is obtained. This result is unexpected since the same compounds of structure (C) and (D) not used as additives in formulations for wood, but used alone as treating agents are not able to confer high oil- and hydro-repellence properties, the concentrations being the same. The Applicant has found that in order to obtain comparable hydro- and oil repellence values on wood, when the components of the invention are used alone dispersed in solvents, it is necessary to carry out repeated treatments (at least 3). From the industrial point of view this represents a remarkable application drawback besides higher costs.

The formulations for wood to which the additives of the invention are added are those known for the wood treatment: impregnating, antivegetative, insecticidal, anti-mould formulations, paints, etc. can be mentioned. Preferably said formulations for wood are based on solvents, such as for example ketones, alcohols, glycols, hydrocarbons.

The impregnating formulations prevailingly comprise as main components natural oils, acrylic and polyurethane polymers. The anti-vegetative formulations prevailingly comprise as main components limonene, alkyd resins and fluorinated acrylic polymers. The insecticidal formulations prevailingly comprise as main components dichlofluoranid, permethrin, linseed oil and dibutylphthalate.

The additives of the invention are added to the formulations in concentrations in the range 0.01–10% by weight, preferably 0.1–5% by weight with respect to the formulation weight. The application of the formulation can be carried out by brushing, spraying, etc. Optionally, if required by the industrial application process, after the treatment a thermal treatment can be carried out for a quicker removal of the solvent.

The present invention will be better illustrated by the following Examples, which have a merely indicative but not limitative purpose of the scope of the invention itself.

EXAMPLES

Evaluation of the Oil-repellence Properties

The oil-repellence properties conferred to a wood substratum by the perfluoropolyether (PFPE) products of the invention have been evaluated, after treatment of the wood specimen with a solution at different concentrations by weight of product, following the procedure reported below:

10 μl of vaseline oil are deposited on the treated surface by a syringe;

the area increase of the deposited drop at subsequent times (5, 10, 15, 20 minutes) is determined.

A greater diffusion of the drops deposited on the treated wood surface and therefore a higher area of the drop show a lower repellent power of the treatment and therefore lower oil-repellence conferred.

Evaluation of the Hydro-repellence Properties

The hydro-repellence properties conferred to a wood substratum by the perfluoropolyether products of the invention have been evaluated as follows: after treatment of the wood specimen with a solution at different concentrations by weight of product, the hydro-repellence of the treated wood is evaluated by depositing 5 μl of a mixture of water/isopropanol on the treated surface. The area of the deposited drops water/isopropanol (at two ratios by weight water/isopropanol equal to 60:40 and 30:70) is measured after one minute from the deposition. A higher drop area on the treated surface shows a lower repellent power of the treatment and therefore lower hydro-repellence conferred.

Example 1

A monofunctional perfluoropolyether compound (PFPE) having formula:

$$Cl(C_3F_6O)_nCF_2—C(O)—NH—C_{18}H_{37} \qquad (I)$$

is used, wherein n=2–5

To a commercial anti-vegetative formulation LINFO® (GEAL) containing limonene, alkyd resins and fluorinated acrylic polymers, the compound of formula (I) is additived at a concentration equal to 1%, 5% and 10% by weight. The resulting product is applied by brushing to a Hemlock wood specimen. At the end of the treatment, before carrying out the oil-repellence test, the wood specimen has been placed in a stove at T=60° C. for 2 hours in order to facilitate the solvent evaporation present in the anti-vegetative formulation.

The anti-vegetative formulation additived with the compound of the invention results effective in conferring hydro-/ oil-repellence properties already starting from only one coat application. The oil-repellence test values evaluated on Hemlock wood treated with different concentrations of the perfluoropolyether additive are reported in Table 1. Such data are compared with those of the not additived anti-vegetative formulation (first column) always applied in one single coat.

TABLE 1

| | PFPE concentrations of formula (I) | | | |
|---|---|---|---|---|
| | — | 1% by wt. | 5% by wt. | 10% by wt. |
| Drop area after 5 min. | 60.8 $mm^2$ | 55 | 37.9 | 35.6 |
| Drop area after 10 min. | 82.2 $mm^2$ | 67.3 | 44.5 | 39.8 |
| Drop area after 15 min. | 97.6 $mm^2$ | 73.8 | 48.8 | 44.5 |
| Drop area after 20 min. | 99.4 $mm^2$ | 75.2 | 50.4 | 48 |

The same wood specimen have furthermore been subjected to hydro-repellence tests by depositing drops of water/isopropanol mixtures having a ratio by weight 60/40 and 30/70 and evaluating the drop area after one minute. The obtained results, compared with those resulting from the application of the anti-vegetative not additived formulation (first column) always applied in one single coat, are reported in Table 2.

TABLE 2

| | PFPE concentrations of formula (I) | | | |
|---|---|---|---|---|
| | — | 1% by wt. | 5% by wt. | 10% by wt. |
| $H_2O$/IPA 60/40 Drop area | 20 $mm^2$ | 9.7 | 8.0 | 7.5 |
| $H_2O$/IPA 30/70 Drop area | 56.3 $mm^2$ | 43.2 | 15.4 | 15.0 |

Example 2

A bifunctional perfluoropolyether (PFPE) compound having formula:

$$H_{37}C_{18}NH—C(O)—CF_2O(CF_2CF_2O)_n(CF_2O)_mCF_2—C(O)—NH—C_{18}H_{37} \quad (II)$$

is used.

The compound of formula (II) is dissolved in methylethylketone forming a solution at 50% by weight. Said solution is additived to the commercial anti-vegetative formulation LINFO® (GEAL) obtaining a final concentration of compound (II) equal to 1%, 5% and 10% by weight. The resulting product is applied by brushing to a Hemlock wood specimen.

The anti-vegetative formulation additived with the compound of the invention results effective in conferring hydro-/oil-repellence properties already with only one coat application. The oil-repellence test values are reported in Table 3, the hydro-repellence test values in Table 4, compared with those obtained with the not additived anti-vegetative formulation (first column) always applied in one single coat.

TABLE 3

| | Bifunctional PFPE concentrations of formula (II) | | | |
|---|---|---|---|---|
| | — | 1% by wt. | 5% by wt. | 10% by wt. |
| Drop area after 5 min. | 60.8 $mm^2$ | 17.8 | 13.6 | 13.6 |
| Drop area after 10 min. | 82.2 $mm^2$ | 17.5 | 14 | 13.6 |
| Drop area after 15 min. | 97.6 $mm^2$ | 18.9 | 14.4 | 13.6 |
| Drop area after 20 min. | 99.4 $mm^2$ | 19.4 | 14.8 | 13.6 |

TABLE 4

| | Bifunctional PFPE concentrations | | | |
|---|---|---|---|---|
| | — | 1% by wt. | 5% by wt. | 10% by wt. |
| $H_2O$/IPA 60/40 Drop area | 20 $mm^2$ | 7.4 | 6.7 | 6.7 |
| $H_2O$/IPA 30/70 Drop area | 56.3 $mm^2$ | 10.0 | 8.1 | 7.7 |

Example 3

To a commercial impregnating formulation XYLOVALCERA® (VELECA) containing natural oils, acrylic and polyurethane polymers, the perfluoropolyether compound of formula (I) is additived at a concentration equal to 1%, 5% and 10% by weight. The resulting product is applied by brushing to a Hemlock wood specimen.

The impregnating formulation additived with the compound of the invention results effective in conferring hydro-/oil-repellence properties already with only one coat application. The oil-repellence test values are reported in Table 5, the hydro-repellence test values in Table 6, compared with those obtained with the not additived impregnating formulation (first column) always applied in one single coat.

TABLE 5

| | Monofunctional PFPE concentrations | | | |
|---|---|---|---|---|
| | — | 1% by wt. | 5% by wt. | 10% by wt. |
| Drop area after 5 min. | 200 $mm^2$ | 91.2 | 36.2 | 32.2 |
| Drop area after 10 min. | 200 $mm^2$ | 134.6 | 34.1 | 35.2 |
| Drop area after 15 min. | 200 $mm^2$ | 150 | 60 | 38.6 |
| Drop area after 20 min. | 200 $mm^2$ | 180 | 64 | 47.2 |

TABLE 6

| | Monofunctional PFPE concentrations | | | |
|---|---|---|---|---|
| | — | 1% by wt. | 5% by wt. | 10% by wt. |
| $H_2O$/IPA 60/40 Drop area | 100 $mm^2$ | 9.8 | 8.9 | 10.4 |
| $H_2O$/IPA 30/70 Drop area | 100 $mm^2$ | 16 | 13.6 | 13.8 |

Example 4

The perfluoropolyether compound of formula (II) is dissolved in methylethylketone forming a solution at 50% by weight. Said solution is additived to the commercial impregnating formulation XYLOVALCERA® (VELECA) obtaining a final concentration of compound (II) equal to 1%, 5% and 10% by weight. The resulting product is applied by brushing to a Hemlock wood specimen.

The impregnating formulation additived with the compound of the invention results effective in conferring hydro-/oil-repellence properties already with only one coat application. The oil-repellence test values are reported in Table 7, the hydro-repellence test values in Table 8, compared with those obtained with the not additived impregnating formulation (first column) always applied in one single coat.

TABLE 7

| | Bifunctional PFPE concentrations | | | |
|---|---|---|---|---|
| | — | 1% by wt. | 5% by wt. | 10% by wt. |
| Drop area after 5 min. | 200 $mm^2$ | 19.1 | 15.8 | 13.1 |
| Drop area after 10 min. | 200 $mm^2$ | 19.1 | 16 | 13.8 |
| Drop area after 15 min. | 200 $mm^2$ | 20.6 | 16 | 13.9 |
| Drop area after 20 min. | 200 $mm^2$ | 21.6 | 16.5 | 14 |

TABLE 8

| | Bifunctional PFPE concentrations | | | |
|---|---|---|---|---|
| | — | 1% by wt. | 5% by wt. | 10% by wt. |
| $H_2O$/IPA 60/40 Drop area | 100 $mm^2$ | 8.6 | 8.4 | 7.4 |
| $H_2O$/IPA 30/70 Drop area | 100 $mm^2$ | 11.4 | 11.3 | 10.9 |

Example 5

To a commercial insecticidal formulation XYLAMON® (SOLVAY) containing dichlofluoanide, pernetrine, linseed oil and dibutylphtalate, the perfluoropolyether compound of formula (I) is additived at a concentration equal to 1%, 5% and 10% by weight. The resulting product is applied by brushing to a Hemlock wood specimen.

The insecticidal formulation additived with the compound of the invention results effective in conferring hydro-/oil-repellence properties already with only one coat application. The oil-repellence test values are reported in Table 9, the hydro-repellence test values in Table 10, compared with those obtained with the not additived insecticidal formulation (first column) always applied in one single coat.

TABLE 9

| | Monofunctional PFPE concentrations | | | |
|---|---|---|---|---|
| | — | 1% by wt. | 5% by wt. | 10% by wt. |
| Drop area after 5 min. | 51 $mm^2$ | 48.8 | 37 | 36 |
| Drop area after 10 min. | 61 $mm^2$ | 55.8 | 42.5 | 39 |

TABLE 9-continued

| | Monofunctional PFPE concentrations | | | |
|---|---|---|---|---|
| | — | 1% by wt. | 5% by wt. | 10% by wt. |
| Drop area after 15 min. | 73.7 $mm^2$ | 56.0 | 52.7 | 41 |
| Drop area after 20 min. | 84.8 $mm^2$ | 58.9 | 59 | 58.5 |

TABLE 10

| | Monofunctional PFPE concentrations | | | |
|---|---|---|---|---|
| | — | 1% by wt. | 5% by wt. | 10% by wt. |
| $H_2O$/IPA 60/40 Drop area | 22.2 $mm^2$ | 9.2 | 7.9 | 7.3 |
| $H_2O$/IPA 30/70 Drop area | 43.8 $mm^2$ | 18.7 | 16.3 | 13.3 |

Example 6

The perfluoropolyether compound of formula (II) is dissolved in methylethylketone forming a solution at 50% by weight. Said solution is additived to the commercial insecticidal formulation XYLAMON® (SOLVAY) obtaining a final concentration of compound (II) equal to 1%, 5% and 10% by weight. The resulting product is applied by brushing to a Hemlock wood specimen.

The insecticidal formulation additived with the compound of the invention results effective in conferring hydro-/oil-repellence properties already with only one coat application. The oil-repellence test values are reported in Table 11, the hydro-repellence test values in Table 12, compared with those obtained with the not additived insecticidal formulation (first column) always applied in one single coat.

TABLE 11

| | Bifunctional PFPE concentrations | | | |
|---|---|---|---|---|
| | — | 1% by wt. | 5% by wt. | 10% by wt. |
| Drop area after 5 min. | 51 $mm^2$ | 30.8 | 13.8 | 12.3 |
| Drop area after 10 min. | 61 $mm^2$ | 32.6 | 14.1 | 12.3 |
| Drop area after 15 min. | 73.7 $mm^2$ | 33.8 | 14.5 | 12.9 |
| Drop area after 20 min. | 84.8 $mm^2$ | 35.1 | 15.3 | 13.5 |

TABLE 12

| | Bifunctional PFPE concentrations | | | |
|---|---|---|---|---|
| | — | 1% by wt. | 5% by wt. | 10% by wt. |
| $H_2O$/IPA 60/40 Drop area | 22.2 $mm^2$ | 7.9 | 7.8 | 7.6 |
| $H_2O$/IPA 30/70 Drop area | 43.8 $mm^2$ | 9.8 | 8.4 | 8.3 |

Example 7

To the commercial insecticidal formulation XYLAMON® (SOLVAY) the perfluoropolyether compound of formula (I) is additived at a concentration equal to 1%, 5% and 10% by weight. The resulting product is applied by brushing to a Parquet wood specimen.

The insecticidal formulation additived with the compound of the invention results effective in conferring hydro-/oil-repellence properties already with only one coat application. The oil-repellence test values are reported in Table 13, the hydro-repellence test values in Table 14, compared with those obtained with the not additived insecticidal formulation (first column) always applied in one single coat.

TABLE 13

| | Monofunctional PFPE concentrations | | | |
|---|---|---|---|---|
| | — | 1% by wt. | 5% by wt. | 10% by wt. |
| Drop area after 5 min. | 200 $mm^2$ | 65 | 38 | 34 |
| Drop area after 10 min. | 200 $mm^2$ | 87 | 40 | 40 |
| Drop area after 15 min. | 200 $mm^2$ | 90 | 49 | 43 |
| Drop area after 20 min. | 200 $mm^2$ | 106 | 49 | 44 |

TABLE 14

| | Monofunctional PFPE concentrations | | | |
|---|---|---|---|---|
| | — | 1% by wt. | 5% by wt. | 10% by wt. |
| $H_2O$/IPA 60/40 Drop area | 100 $mm^2$ | 8 | 8 | 8 |
| $H_2O$/IPA 30/70 Drop area | 100 $mm^2$ | 18 | 14 | 13 |

Example 8

The perfluoropolyether compound of formula (II) is dissolved in methylethylketone forming a solution at 50% by weight. Said solution is additived to the commercial insecticidal formulation XYLAMON® (SOLVAY) obtaining a final concentration of compound (II) equal to 1%, 5% and 10% by weight. The resulting product is applied by brushing to a Parquet wood specimen.

The insecticidal formulation additived with the compound of the invention results effective in conferring hydro-/oil-repellence properties already with only one coat application. The oil-repellence test values are reported in Table 15, the hydro-repellence test values in Table 16, compared with those obtained with the not additived insecticidal formulation (first column) always applied in a single coat.

TABLE 15

| | Bifunctional PFPE concentrations | | | |
|---|---|---|---|---|
| | — | 1% by wt. | 5% by wt. | 10% by wt. |
| Drop area after 5 min. | 200 $mm^2$ | 14 | 11 | 12 |
| Drop area after 10 min. | 200 $mm^2$ | 14 | 12 | 13 |
| Drop area after 15 min. | 200 $mm^2$ | 15 | 13 | 13 |
| Drop area after 20 min. | 200 $mm^2$ | 15 | 13 | 13 |

TABLE 16

| | Bifunctional PFPE concentrations | | | |
|---|---|---|---|---|
| | — | 1% by wt. | 5% by wt. | 10% by wt. |
| $H_2O$/IPA 60/40 Drop area | 100 $mm^2$ | 8 | 7 | 7 |
| $H_2O$/IPA 30/70 Drop area | 100 $mm^2$ | 10 | 9 | 9 |

Example 9

To the commercial insecticidal formulation XYLAMON® (SOLVAY) the perfluoropolyether compound of formula (I) is additived at a concentration equal to 1%, 5% and 10% by weight. The resulting product is applied by brushing to a pine wood specimen.

The insecticidal formulation additived with the compound of the invention results effective in conferring hydro-/oil-repellence properties already with only one coat application. The oil-repellence test values are reported in Table 17, the hydro-repellence test values in Table 18, compared with those obtained with the not additived insecticidal formulation (first column) always applied in one single coat.

TABLE 17

| | Monofunctional PFPE concentrations | | | |
|---|---|---|---|---|
| | — | 1% by wt. | 5% by wt. | 10% by wt. |
| Drop area after 5 min. | 250 $mm^2$ | 100 | 44 | 47 |
| Drop area after 10 min. | 250 $mm^2$ | 121 | 56 | 64 |
| Drop area after 15 min. | 250 $mm^2$ | 165 | 74 | 75 |
| Drop area after 20 min. | 250 $mm^2$ | 181 | 79 | 84 |

TABLE 18

| | Monofunctional PFPE concentrations | | | |
|---|---|---|---|---|
| | — | 1% by wt. | 5% by wt. | 10% by wt. |
| $H_2O$/IPA 60/40 Drop area | 100 $mm^2$ | 10 | 10 | 9 |
| $H_2O$/IPA 30/70 Drop area | 100 $mm^2$ | 16 | 12 | 13 |

Example 10

The perfluoropolyether compound of formula (II) is dissolved in methylethylketone forming a solution at 50% by weight. Said solution is additived to the commercial insecticidal formulation XYLAMON® (SOLVAY) obtaining a final concentration of compound (II) equal to 1%, 5% and 10% by weight. The resulting product is applied by brushing to a pine wood specimen.

The insecticidal formulation additived with the compound of the invention results effective in conferring hydro-/oil-repellence properties already with only one coat application. The oil-repellence test values are reported in Table 19, the hydro-repellence test values in Table 20, compared with those obtained with the not additived insecticidal formulation (first column) always applied in one single coat.

TABLE 19

| | Bifunctional PFPE concentrations | | | |
|---|---|---|---|---|
| | — | 1% by wt. | 5% by wt. | 10% by wt. |
| Drop area after 5 min. | 250 $mm^2$ | 14 | 14 | 13 |
| Drop area after 10 min. | 250 $mm^2$ | 15 | 14 | 13 |
| Drop area after 15 min. | 250 $mm^2$ | 15 | 14 | 14 |
| Drop area after 20 min. | 250 $mm^2$ | 15 | 14 | 15 |

TABLE 20

| | Bifunctional PFPE concentrations | | | |
|---|---|---|---|---|
| | — | 1% by wt. | 5% by wt. | 10% by wt. |
| $H_2O$/IPA 60/40 Drop area | 100 $mm^2$ | 9 | 8 | 7 |
| $H_2O$/IPA 30/70 Drop area | 100 $mm^2$ | 10 | 10 | 10 |

Example 11

The perfluoropolyether compound of formula (II) is dissolved in methylethylketone forming a solution at 50% by weight. Said solution is additived to the commercial insecticidal formulation XYLOVALCERA® (VELECA) obtaining a final concentration of compound (II) equal to 1%, 5% and 10% by weight. The resulting product is applied by brushing to a pine wood specimen.

The insecticidal formulation additived with the compound of the invention results effective in conferring hydro-/oil-repellence properties already with only one coat application. The oil-repellence test values are reported in Table 21, the hydro-repellence test values in Table 22, compared with those obtained with the not additived insecticidal formulation (first column) always applied in one single coat.

TABLE 21

| | Bifunctional PFPE concentrations | | | |
|---|---|---|---|---|
| | — | 1% by wt. | 5% by wt. | 10% by wt. |
| Drop area after 5 min. | 55 $mm^2$ | 12 | 11 | 11 |
| Drop area after 10 min. | 56 $mm^2$ | 13 | 12 | 11 |
| Drop area after 15 min. | 58 $mm^2$ | 14 | 12 | 12 |
| Drop area after 20 min. | 58 $mm^2$ | 14 | 13 | 13 |

TABLE 22

| | Bifunctional PFPE concentrations | | | |
|---|---|---|---|---|
| | — | 1% by wt. | 5% by wt. | 10% by wt. |
| $H_2O$/IPA 60/40 Drop area | 17 $mm^2$ | 8 | 8 | 7 |
| $H_2O$/IPA 30/70 Drop area | 34 $mm^2$ | 9 | 9 | 8 |

Example 12

The perfluoropolyether compound of formula (II) is dissolved in methylethylketone forming a solution at 50% by weight. Said solution is additived to the commercial insecticidal formulation XYLOVALCERA® (VELECA) obtaining a final concentration of compound (II) equal to 1%, 5% and 10% by weight. The resulting product is applied by brushing to a parquet wood specimen.

The insecticidal formulation additived with the compound of the invention results effective in conferring hydro-/oil-repellence properties already with only one coat application. The oil-repellence test values are reported in Table 23, the hydro-repellence test values in Table 24, compared with those obtained with the not additived insecticidal formulation (first column) always applied in one single coat.

TABLE 23

| | Bifunctional PFPE concentrations | | | |
|---|---|---|---|---|
| | — | 1% by wt. | 5% by wt. | 10% by wt. |
| Drop area after 5 min. | 51 $mm^2$ | 16 | 14 | 12 |
| Drop area after 10 min. | 51 $mm^2$ | 16 | 14 | 14 |
| Drop area after 15 min. | 54 $mm^2$ | 17 | 15 | 14 |
| Drop area after 20 min. | 54 $mm^2$ | 17 | 15 | 14 |

TABLE 24

| | Bifunctional PFPE concentrations | | | |
|---|---|---|---|---|
| | — | 1% by wt. | 5% by wt. | 10% by wt. |
| $H_2O$/IPA 60/40 Drop area | 17 $mm^2$ | 8 | 8 | 8 |
| $H_2O$/IPA 30/70 Drop area | 34 $mm^2$ | 11 | 10 | 10 |

Example 13

Comparative

The perfluopropolyether compound of structure (I) is not used as additive of a formulation for the wood treatment as in Examples 1–12, but used dispersed in a n-hexane solution containing the compound (I) at a concentration equal to 5% by weight.

3 coats of product have been necessary to obtain a good coating of the surface of the hemlock wood specimen and to observe a conferring of hydro- and oil-repellence properties comparable to the case of Examples 1–12, in which only one coat application has been sufficient.

The oil-repellence test values are reported in Table 25, the hydro-repellence test values in Table 26, compared with the results of Examples 1, 3, 5 wherein the compound (I) is combined with various formulations for the wood treatment and applied in a single coat at the same concentrations.

TABLE 25

| | Formulation absence 1 coat | Formulation absence 3 coats | With Anti-vegetative 1 coat | With impregnant 1 coat | With insecticidal 1 coat |
|---|---|---|---|---|---|
| Drop area after 5 min. | 72 $mm^2$ | 20 | 37.9 | 36.2 | 37 |
| Drop area after 10 min. | 75 $mm^2$ | 21.1 | 44.5 | 34.1 | 42.5 |
| Drop area after 15 min. | 78 $mm^2$ | 21.2 | 48.8 | 60 | 52.7 |
| Drop area after 20 min. | 82 $mm^2$ | 22.0 | 50.4 | 64 | 59 |

TABLE 26

| | Formulation absence 1 coat | Formulation absence 3 coats | With Anti-vegetative 1 coat | With impregnant 1 coat | With insecticidal 1 coat |
|---|---|---|---|---|---|
| $H_2O$/IPA 60/40 Drop area | 30 $mm^2$ | 9.6 | 8 | 8.9 | 7.9 |
| $H_2O$/IPA 30/70 Drop area | 33 $mm^2$ | 12.2 | 15.4 | 13.6 | 16.3 |

Example 14

Comparative

The perfluoropolyether compound of structure (II) is not used as additive of a formulation for the wood treatment as in Examples 1–12, but used dispersed in a n-hexane solution containing the compound (II) at a concentration equal to 5% by weight.

3 coats of product have been necessary to obtain a good coating of the surface of the hemlock wood specimen and to observe a conferring of hydro- and oil-repellence properties comparable with the case of Examples 1–12, in which only one coat application has been sufficient.

The oil-repellence test values are reported in Table 27, the hydro-repellence test values in Table 28, compared with the results of Examples 2, 4, 6 wherein the compound (II) is combined with various formulations for the wood treatment and applied in one single coat at the same concentration.

TABLE 27

| | Formulation absence 1 coat | Formulation absence 3 coats | With Anti-vegetative 1 coat | With impregnant 1 coat | With insecticidal 1 coat |
|---|---|---|---|---|---|
| Drop area after 5 min. | 41 $mm^2$ | 11.4 | 13.6 | 15.8 | 13.8 |
| Drop area after 10 min. | 44 $mm^2$ | 11.4 | 14 | 16 | 14.1 |
| Drop area after 15 min. | 46 $mm^2$ | 12.4 | 14.4 | 16 | 14.5 |
| Drop area after 20 min. | 47 $mm^2$ | 12.5 | 14.8 | 16.5 | 15.3 |

TABLE 28

| | Formulation absence 1 coat | Formulation absence 3 coats | With Anti-vegetative 1 coat | With impregnant 1 coat | With insecticidal 1 coat |
|---|---|---|---|---|---|
| $H_2O$/IPA 60/40 Drop area | 25 $mm^2$ | 11 | 6.7 | 8.4 | 7.8 |
| $H_2O$/IPA 30/70 Drop area | 30 $mm^2$ | 8.4 | 8.1 | 11.3 | 8.4 |

Example 15

Comparative

A monofunctional perfluoropolyether (PFPE) phosphate having the formula:

$$[Cl(CF_3F_6O)_pCF_2CH_2O(CH_2CH_2O)_n]_mP(O)_{m-3}$$

is used, with p=2–5, n=1–4, m=1=3

Said compound is used dispersed in a solution of isopropyl alcohol at a concentration equal to 5% by weight. Although up to 3 coats of product on a hemlock wood specimen have been applied, it has not been possible to obtain suitable hydro-repellence values as in the case of Examples 1–12, wherein only one coat application has been sufficient.

The hydro-repellence test values of the monofunctional phosphate are reported in Table 29 compared with the hydro-repellence values conferred by the compounds of structure (I) and (II) of the invention reported in Examples 1 and 2.

TABLE 29

| | Phosphate PFPE 1 coat | Phosphate PFPE 3 coats | Compound (I) with Anti-vegetative 1 coat | Compound (II) with Anti-vegetative 1 coat |
|---|---|---|---|---|
| $H_2O$/IPA 60/40 Drop area | 100 $mm^2$ | 100 | 8.0 | 6.7 |
| $H_2O$/IPA 30/70 Drop area | 100 $mm^2$ | 100 | 15.4 | 8.1 |

What is claimed is:

1. A process for preparing impregnating, antivegetative, insecticidal, anti-mould and paint formulations for wood treatment, excluding formulations based on paraffin waxes dissolved in hydrocarbon solvents, by adding to said formulations mono- and bifunctional perfluoropolyether compounds, said method improving the following property combination of surfaces of the treated wood:

hydro-repellence determined by depositing 5 μl of water/isopropanol mixture at two ratio by weight 60:40 and 30:70, and by subsequently determining the area of the drop;

oil-repellence determined by depositing 10 μl if vaseline oil and by subsequently determining the area of the drop after 5, 10, 15 and 20 minutes;

absence of change in a natural aspect of the wood;

substantial maintenance of the properties conferred by formulations for wood treatment after addition;

compatibility of the additive with formulations for wood so as to have substantially uniform oil- and hydro-repellence properties on the surface of the treated wood;

wetting capacities;

friction coefficient;

said mono- and bifunctional perfluoropolyether compounds having the following structures:

$R_f$—CFY—L—W (C)

W—L—YFC—O—$R_f$—CFY—L—W (D)

wherein:

L is an organic group selected from —$CH_2$—$(OCH_2CH_2)_n$—,

—CO—NR'—, with R'=H or $C_1$–$C_4$ alkyl group;

n=0–8;

Y=F, $CF_3$;

W is selected from $C_1$–$C_{50}$ alkyl groups, optionally containing one or more ether O, $C_6$–$C_{50}$ aryl groups, $C_7$–$C_{50}$ alkyl-aryl or aryl-alkyl groups;

$R_f$ has a number average molecular weight in the range 350–8,000, and it comprises repeating units having at least one of the following structures, statistically placed along the chain:

(CFXO), $(CF_2CF_2O)$, $(CF_2CF_2CF_2O)$, $(CF_2CF_2CF_2CF_2O)$, $(CR_4R_5CF_2CF_2O)$, $(CF(CF_3)CF_2O)$, $(CF_2CF(CF_3)O)$, wherein X=F, $CF_3$; $R_4$ and $R_5$, equal to or different from each other, are selected from H, Cl, or perfluoroalkyl from 1 to 4 carbon atoms.

2. The process according to claim 1, wherein $R_f$ is selected from the following structures:

1) —$(CF_2O)_{a'}$—$(CF_2CF_2O)_{b'}$— with a'/b' in the range 0.5–2, extremes included, a' and b' being integers such as to give the above mentioned molecular weight;

2) —$(C_3F_6O)_r$—$(C_2F_4O)_b$—$(CFXO)_t$— with r/b=0.5–2.0; (r+b)/t is in the range 10–30, b, r and t being integers such as to give the above mentioned molecular weight, X has the above mentioned meaning;

3) —$(C_3F_6O)_{r'}$—$(CFXO)_{t'}$— when t' is different from O then r'/t'=10–30, r' and t' being integers such as to give the above mentioned molecular weight; X has the above indicated meaning;

4) —$(OCF_2CF(CF_3))_z$—$OCF_2(R'f)_y$—$CF_2O$—$(CF(CF_3)CF_2O)_z$— wherein z is an integer such that the molecular weight is the above mentioned one;

y is an integer between 0 and 1 and R'f is a fluoroalkylene group having for example 1–4 carbon atoms;

5) —$(OCF_2CF_2CR_4R_5)_q$—$OCF_2(R'f)_y$—$CF_2O$—$(CR_4R_5CF_2CF_2O)_s$—wherein:

q and s are integers such that the molecular weight is the above mentioned one;

$R_4$, $R_5$, R'f, y have the above mentioned meaning;

6) —$(C_3F_6O)_{r'''}(CFXO)_{t'''}$—$OCF_2(R'f)_y$—$CF_2O(CF(CF_3)CF_2O)_{r'''}(CFXO)_{t'''}$— wherein r'''/t'''=10–30, r''' and t''' being integers such as to give the above mentioned molecular weight.

3. The process according to claim 1, wherein in the structure (C) the other end group is of the T—O-type, wherein T is a (per)fluoroalkyl group selected from:

—$CF_3$, —$C_2F_5$, —$C_3F_7$, —$CF_2Cl$, —$C_2F_4Cl$, —$C_3F_6Cl$; optionally one or two F atoms being replaced by H.

4. The process according to claim 1, wherein the perfluoropolyether compounds have structure (D) wherein L is —CO—NR'—, with R'=H; W is a $C_8$–$C_{25}$ alkyl group; $R_f$ has structure 1).

5. The process according to claim 1 wherein L is —$CH_2$—$(OCH_2CH_2)_n$— with n=1–3.

6. The process according to claim 1 wherein W is a $C_8$–$C_{25}$ alkyl group.

7. The process according to claim 1 wherein $R_f$ has a number average molecular weight in the range 500–3,000.

8. The process according to claim 1, wherein the formulations for the wood treatment are selected from the impregnating, antivegetative, insecticidal, anti-mould formulations, paints, and paints based on solvents.

9. The process according to claim 8, wherein the impregnating formulations comprise as main components natural oils, acrylic and polyurethane polymers.

10. The process according to claim 8, wherein the antivegetative formulations comprise as main components limonene, alkyd resins and fluorinated acrylic polymers.

11. The process according to claim 8, wherein the insecticidal formulations comprise as main components dichlofluoanid, pernethrin, linseed oil and dibutylphthalate.

12. The process according to claim 1, wherein the compounds are added to the formulations in concentrations in the range 0.01–10% by weight, with respect to the formulation weight.

13. The process according to claim 12 wherein the compounds are added to the formulations in concentrations in the range 0.1–5% by weight with respect to the formulation weight.

14. The process according to claim 1, wherein the formulation is applied by brushing or spraying.

* * * * *